US012586830B2

(12) United States Patent
Yang et al.

(10) Patent No.: US 12,586,830 B2
(45) Date of Patent: Mar. 24, 2026

(54) BATTERY MODULE, BATTERY PACK, AND VEHICLE

(71) Applicant: LG ENERGY SOLUTION, LTD., Seoul (KR)

(72) Inventors: Jin-Oh Yang, Daejeon (KR); Hae-Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 645 days.

(21) Appl. No.: 17/924,347

(22) PCT Filed: Sep. 15, 2021

(86) PCT No.: PCT/KR2021/012645
§ 371 (c)(1),
(2) Date: Nov. 9, 2022

(87) PCT Pub. No.: WO2022/080686
PCT Pub. Date: Apr. 21, 2022

(65) Prior Publication Data
US 2023/0187717 A1 Jun. 15, 2023

(30) Foreign Application Priority Data

Oct. 12, 2020 (KR) ........................ 10-2020-0131449

(51) Int. Cl.
*H01M 50/143* (2021.01)
*H01M 10/48* (2006.01)
(Continued)

(52) U.S. Cl.
CPC ....... *H01M 10/482* (2013.01); *H01M 50/143* (2021.01); *H01M 50/204* (2021.01); *H01M 50/417* (2021.01); *H01M 2220/20* (2013.01)

(58) Field of Classification Search
CPC ............. H01M 10/482; H01M 50/143; H01M 50/417; H01M 50/204; H01M 2220/20
See application file for complete search history.

(56) References Cited

U.S. PATENT DOCUMENTS 4,053,691 A 10/1977 Ciliberti, Jr.
8,465,833 B2 6/2013 Lee et al.
(Continued)

FOREIGN PATENT DOCUMENTS

CN 103649272 A 3/2014
CN 107431147 A 12/2017
(Continued)

OTHER PUBLICATIONS

The decision of JPO to grant a Patent for Application JP 2022563473 (Year: 2024).*
(Continued)

*Primary Examiner* — Alexander Usyatinsky
(74) *Attorney, Agent, or Firm* — Morgan, Lewis & Bockius LLP

(57) ABSTRACT

A battery module may include a plurality of battery cells; a module case having an inner space therein and accommodating the plurality of battery cells in the inner space; a polymer member filled in at least a part of the inner space of the module case accommodating the plurality of battery cells; and a filler at least partially inside the polymer member and interposed in at least one space of a space between at least one of the plurality of battery cells and the module case and a space between the plurality of battery cells.

12 Claims, 8 Drawing Sheets

100

(51) Int. Cl.
   *H01M 50/204* (2021.01)
   *H01M 50/417* (2021.01)

(56) References Cited

U.S. PATENT DOCUMENTS

| | | |
|---|---|---|
| 11,905,385 B2 | 2/2024 | O'Neil et al. |
| 2012/0003508 A1 | 1/2012 | Narbonne et al. |
| 2012/0074617 A1 | 3/2012 | Eckel et al. |
| 2013/0052452 A1 | 2/2013 | Lee et al. |
| 2015/0318518 A1 | 11/2015 | Kim |
| 2016/0181576 A1 | 6/2016 | Zouta et al. |
| 2018/0076493 A1 | 3/2018 | Park et al. |
| 2018/0123103 A1 | 5/2018 | Kang et al. |
| 2018/0183117 A1 | 6/2018 | Cho et al. |
| 2018/0223070 A1 | 8/2018 | O'Neil et al. |
| 2018/0375076 A1* | 12/2018 | Lampe-Onnerud .......................... H01M 50/296 |
| 2020/0185797 A1* | 6/2020 | Park ........................ B60L 50/64 |
| 2020/0227799 A1 | 7/2020 | Fukutome et al. |
| 2020/0343499 A1 | 10/2020 | Yoo et al. |

FOREIGN PATENT DOCUMENTS

| | | |
|---|---|---|
| CN | 110462875 A | 11/2019 |
| CN | 108288739 B | 5/2020 |
| JP | 2000-108687 A | 4/2000 |
| JP | 2003-145560 A | 5/2003 |
| JP | 2014-528973 A | 10/2014 |
| JP | 2016-50662 A | 4/2016 |
| JP | 2018-510463 A | 4/2018 |
| JP | 2020-507194 A | 3/2020 |
| KR | 10-2013-0049520 A | 5/2013 |
| KR | 10-2014-0133218 A | 11/2014 |
| KR | 10-2016-0146587 A | 12/2016 |
| KR | 10-2018-0112630 A | 10/2018 |
| KR | 10-1976079 B1 | 5/2019 |
| KR | 10-2019-0132631 A | 11/2019 |
| KR | 10-2135629 B1 | 7/2020 |
| KR | 10-2139491 B1 | 7/2020 |
| WO | 2014/208423 A1 | 12/2014 |
| WO | 2018/148282 A1 | 8/2018 |
| WO | 2019/021880 A1 | 1/2019 |

OTHER PUBLICATIONS

Office Action dated Jun. 26, 2024 issued in corresponding Chinese Patent Application No. 202180015719.0.

Office Action issued in corresponding Chinese Patent Application No. 202180015719.0, dated Sep. 16, 2023.

Extended European Search Report dated Dec. 27, 2018 issued in European Patent Application No. 21880334.4.

International Search Report (with partial translation) and Written Opinion dated Jan. 3, 2022, for corresponding International Patent Application No. PCT/KR2021/012645.

Office Action issued in corresponding Japanese Patent Application No. 2022-563473, dated Nov. 6, 2023.

\* cited by examiner

BATTERY MODULE, BATTERY PACK, AND VEHICLE

TECHNICAL FIELD

The present application claims priority to Korean Patent Application No. 10-2020-0131449 filed on Oct. 12, 2020 in the Republic of Korea, the disclosures of which are incorporated herein by reference.

The present disclosure relates to a battery module, a battery pack, and a vehicle, and more particularly, to a battery module, a battery pack, and a vehicle with reduced manufacturing cost and improved safety against fire.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

In addition, depending on the shape of the exterior, the lithium secondary battery may be classified into a cylindrical battery cell in which an electrode assembly is included in a metal can and a pouch-type secondary battery in which an electrode assembly is included in a pouch made of an aluminum laminate sheet.

In particular, the demand for large-capacity battery modules applied to electronic devices, vehicles, and the like is increasing recently. Such a large-capacity battery module may include a plurality of battery cells, for example a plurality of cylindrical battery cells.

However, in the battery module, when thermal runaway, fire, explosion, or the like occurs in some of the plurality of cylindrical battery cells, high-temperature heat, fragments, flame, gas, or the like of the electrode assembly may be discharged to raise the temperature of other adjacent battery cells. Accordingly, there is a problem in that thermal runaway, fire, or the like is propagated to other adjacent battery cells, resulting in a larger secondary fire or explosion, thereby exacerbating the damage.

Moreover, the space between the plurality of cylindrical battery cells or between the module case and the battery cell is very narrow in many cases, but this structure is very vulnerable to the propagation of heat or flame between the plurality of battery cells. In addition, due to such a narrow space, there are many restrictions in providing a separate member for preventing heat or flame propagation. Further, in the case of the conventional battery module, a configuration in which a specific material is input to prevent the propagation of internal heat or flame is also attempted, but there is a problem that the cost of the specific material is high. Accordingly, the conventional battery module has many difficulties in efficiently securing safety against heat or fire.

DISCLOSURE

Technical Problem

The present disclosure is designed to solve the problems of the related art, and therefore the present disclosure is directed to providing a battery module capable of efficiently securing safety against heat or fire, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In order to accomplish the above object, a battery module according to one aspect of the present disclosure comprises a plurality of battery cells; a module case having an inner space formed therein and configured to accommodate the plurality of battery cells in the inner space; a polymer member configured to be filled in at least a part of the inner space of the module case accommodating the plurality of battery cells; and a filler at least partially located inside the polymer member and interposed in at least one space of a space between at least one of the plurality of battery cells and the module case and a space between the plurality of battery cells.

The polymer member may include a silicon resin.

The polymer member may be cured after being filled in at least a part of the inner space of the module case.

The filler may include a plurality of particles and is dispersed inside the polymer member.

The filler may include a plastic material or a ceramic material.

The filler may include a plurality of particles with different sizes.

The filler may have an empty space formed therein.

The filler may contain a fire-extinguishing material therein.

The filler may contain a flame-retardant liquid therein.

The filler may be configured such that the polymer member is partially inserted therein.

The filler may include a plurality of particles that respectively have an outer layer and a porous inner layer.

In addition, in another aspect of the present disclosure, there is also provided a battery pack, comprising at least one battery module according to the present disclosure.

Moreover, in still another aspect of the present disclosure, there is also provided a vehicle, comprising at least one battery module according to the present disclosure.

Advantageous Effects

According to an embodiment of the present disclosure, a battery module with excellent safety and economic feasibility may be secured.

In particular, according to one embodiment of the present disclosure, since the polymer member and the filler are included in the battery module, heat or flame propagation prevention performance, explosion prevention performance, or the like may be more effectively secured.

Moreover, the polymer member may serve as a barrier to prevent flame from being propagated to other adjacent battery cells when any one of the plurality of battery cells ignites and explodes. Accordingly, it is possible to effectively prevent the plurality of battery cells from serially exploding or spreading a fire.

In addition, according to an embodiment of the present disclosure, since the heat/flame propagation prevention performance is secured at a relatively low cost, a battery module or a battery pack having economic feasibility along with excellent safety may be implemented.

In particular, according to one embodiment of the present disclosure, when a silicon resin (silicon polymer) serving as the polymer member is injected into the battery pack to delay ignition or explosion of the battery cell, the amount of silicon resin may be reduced by means of the filler.

Therefore, according to this embodiment of the present disclosure, since the amount of relatively expensive silicon resin may be reduced, the manufacturing cost may be reduced.

In addition, according to an embodiment of the present disclosure, when the filler is configured to have a lower density than the silicon resin, it may be advantageous to lighten the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Also, in this specification, terms indicating directions such as "upper", "lower", "left", "right", "front" and "rear" may be used, but these terms are for convenience of explanation only, and it will be obvious to those skilled in the art that these terms may vary depending on the position of an object or the position of an observer.

Figure 1:
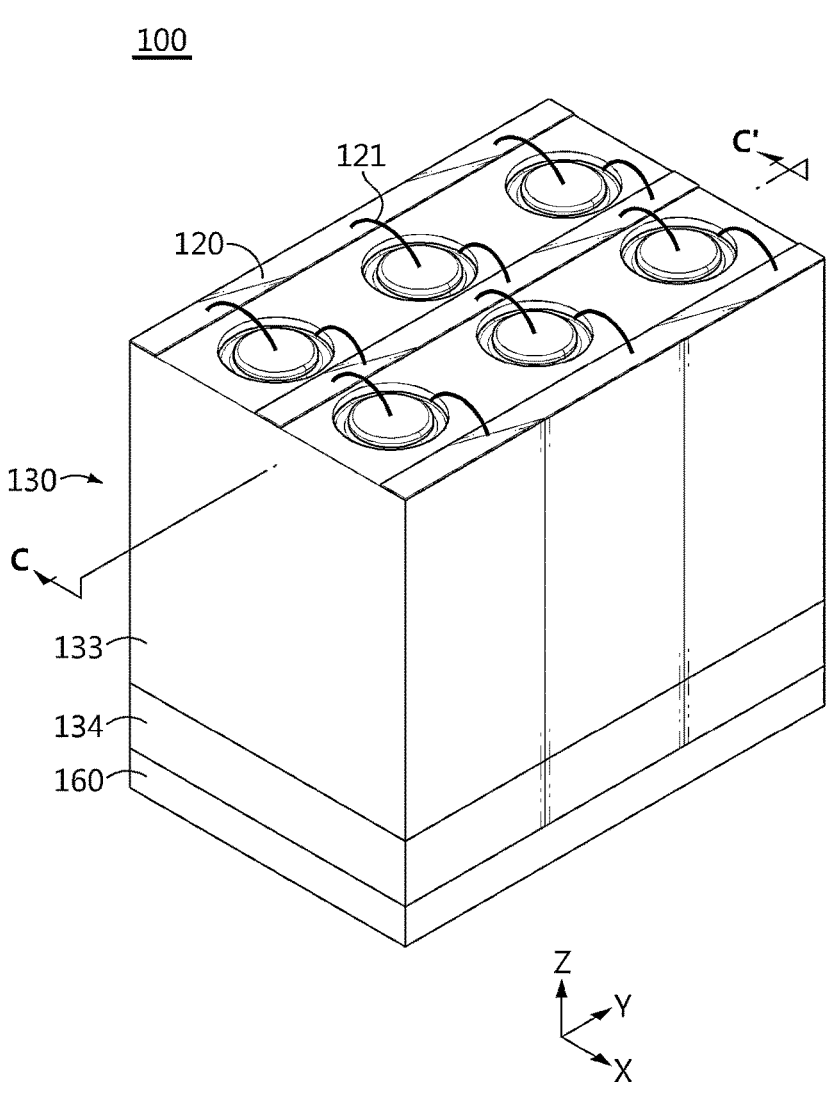
FIG. 1 is a perspective view schematically showing a battery module according to an embodiment of the present disclosure.
Figure 2:
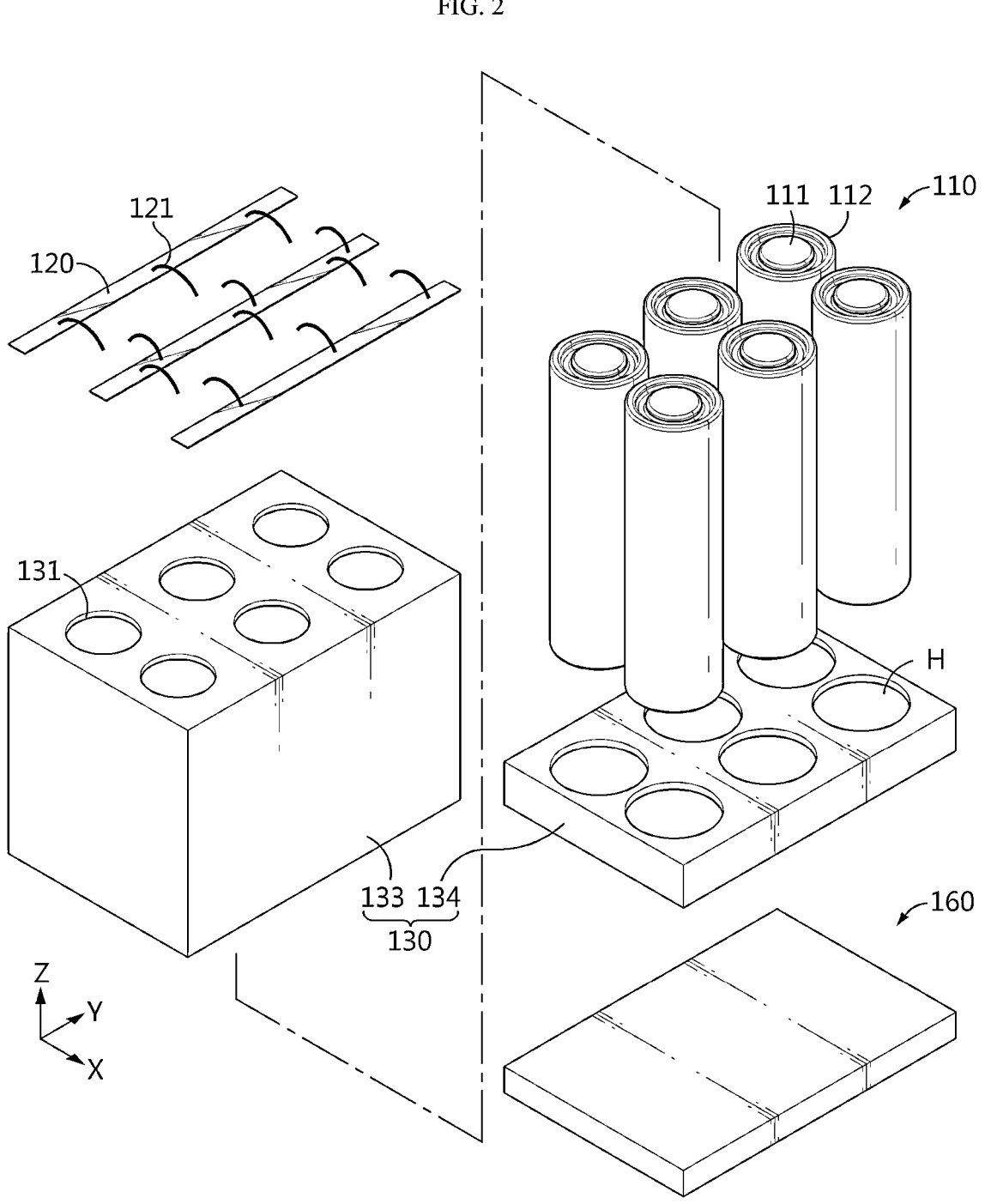
FIG. 2 is an exploded perspective view schematically showing that some components of the battery module according to an embodiment of the present disclosure are separated.
Figure 3:
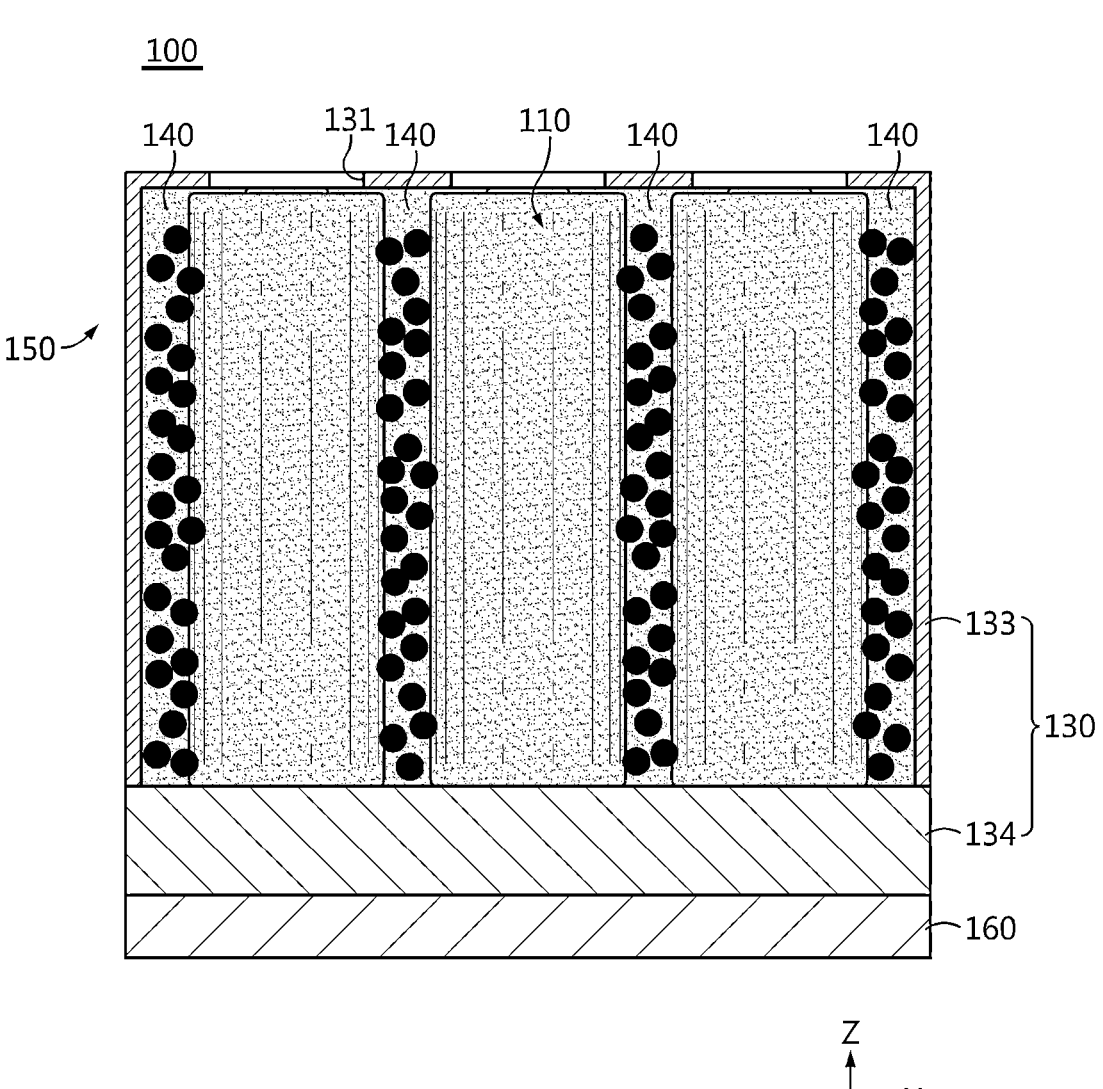
FIG. 3 is a diagram schematically showing an internal configuration of the battery module according to an embodiment of the present disclosure.

FIG. 1 is a perspective view schematically showing a battery module according to an embodiment of the present disclosure. FIG. 2 is an exploded perspective view schematically showing that some components of the battery module according to an embodiment of the present disclosure are separated. In addition, FIG. 3 is a diagram schematically showing an internal configuration of the battery module according to an embodiment of the present disclosure. In particular, FIG. 3 may be regarded as a cross-sectional view, taken along the line C-C' of FIG. 1. In addition, in FIG. 2, for convenience of illustration, a polymer member and a filler are not depicted.

Referring to FIGS. 1 to 3, a battery module 100 according to an embodiment of the present disclosure includes a plurality of battery cells 110, a module case 130, a polymer member 140, and a filler 150.

Specifically, the battery cell 110 may be a cylindrical battery cell having a cylindrical battery can. The cylindrical battery cell 110 may include electrode terminals 111, 112 positioned at upper and/or lower portions thereof. For example, the cylindrical battery cell 110 may have a positive electrode terminal 111 and a negative electrode terminal 112 disposed at the upper portion thereof. Moreover, in the case of a cylindrical battery cell, a cap assembly at the top thereof may be the positive electrode terminal 111, and a battery cell body, namely a battery can (case), may be the negative electrode terminal 112. In addition, the positive electrode terminal 111 and the negative electrode terminal 112 may be positioned to be spaced apart from each other. The positive electrode terminal 111 and the negative electrode terminal 112 may be electrically insulated from each other.

In addition, the battery module 100 according to an embodiment of the present disclosure may further include a bus bar 120. The bus bar 120 may include a metal material such as aluminum, copper, or nickel. The plurality of battery cells 110 may be electrically connected in series, in parallel, or in series and parallel through the bus bar 120. In addition, the bus bar 120 may be electrically connected to the positive electrode terminal 111 or the negative electrode terminal 112 of the battery cell 110 through a metal wire 121. For example, the metal wire 121 may be configured to have one end in contact with the positive electrode terminal of the battery cell 110 and the other in contact with the bus bar 120. Alternatively, the bus bar 120 may directly contact the electrode terminals 111, 112 without the metal wire 121.

Such a configuration of the battery cell 110 is widely known to those skilled in the art at the time of filing of this application, and thus will not be described in detain here. In addition, although an example of the battery cell 110 is illustrated in FIG. 3, the battery module 100 according to the present disclosure is not limited to the configuration of the battery cell 110 having a specific shape. That is, various types of battery cells 110 known at the time of filing of this application may be employed in the battery module 100 according to the present disclosure.

In addition, the module case 130 may have an inner space such that the plurality of battery cells 110 are accommodated in the inner space. For example, the module case 130 may have a box shape with an empty inside to accommodate the plurality of battery cells 110. As a more specific example, the module case 130 may include an upper frame 133 and a lower frame 134. Here, the upper frame 133 may be configured to cover an upper portion and a side portion of the plurality of battery cells 110. In addition, the lower frame 134 may have a plurality of placing grooves H configured such that the plurality of battery cells 110 are partially inserted therein. For example, the placing groove H of the lower frame 134 may be configured such that a lower portion part of the battery cell 110 is inserted therein based on the center of the battery cell 110.

Moreover, the module case 130 may have a plurality of exposure holes 131 formed at the upper and/or lower portions thereof. Each of the plurality of exposure holes 131 may be configured in the form of perforating a part of the module case 130 so that the upper portion of the plurality of battery cells 110 is exposed to the outside. For example, as shown in FIG. 2, the plurality of exposure holes 131 may be provided at the upper surface of the upper frame 133 so that the electrode terminals 111, 112 provided at the upper portion of the plurality of battery cells 110 are exposed to the outside.

The polymer member 140 may be configured to fill at least a part of the inner space of the module case 130. Moreover, since the plurality of battery cells 110 are accommodated in the inner space of the module case 130, the polymer member 140 may be filled in at least a part of the space other than a space occupied by the battery cells. In particular, the polymer member 140 may be provided in at least one space of a space between the plurality of battery cells 110 and a space between the plurality of battery cells and the inner surface of the module case 130, as shown in FIG. 3.

At least a part of the filler 150 may be located inside the polymer member 140. That is, the filler 150 may be entirely embedded in the polymer member 140, or may be partially embedded in the polymer member 140 to be exposed out of the polymer member 140. In addition, the filler 150 may be interposed in the space between at least one of the plurality of battery cells and the inner surface of the module case, together with the polymer member 140. In addition, the filler 150 may be interposed in the space between the plurality of battery cells 110, together with the polymer member 140.

According to this embodiment of the present disclosure, since the polymer member 140 and the filler 150 having different physical properties or characteristics are provided inside the battery module 100, it may be advantageous to secure various performances together. For example, the polymer member 140 may be made of a material capable of securing safety against heat or fire, and the filler 150 may be made of a material having excellent rigidity or low weight or cost. In this case, it is possible to implement a battery module excellent in rigidity, lightness, economic efficiency, or the like along with safety against heat or fire. Moreover, the polymer member 140 may serve as a barrier to prevent flame from being propagated to other adjacent battery cells 110 when any one of the plurality of battery cells 110 ignites and explodes. Accordingly, it is possible to effectively prevent the plurality of battery cells 110 from serially exploding or spreading a fire.

The polymer member 140 may include a silicon resin. According to this embodiment, it may be advantageous to secure safety against heat or fire for the battery module 100. For example, when the silicon resin is positioned between the battery cell 110 and the module case 130, it is possible to prevent the heat or fire of the battery cell 110 from propagating to the outside of the module case 130. In addition, in this case, it is advantageous to prevent explosion of the battery cell 110, and even if an explosion occurs, it is possible to suppress the scattering of fragments generated by the explosion to the outside of the battery module 100 as much as possible. In addition, when the silicon resin is positioned between the battery cells 110, it is possible to prevent heat or fire from being propagated between the battery cells 110. Therefore, in this case, it is possible to prevent thermal runaway or the like from being propagated inside the battery module. The silicon polymer resin may be an artificial polymer compound having a main backbone by siloxane bonds. However, the resin used for the polymer member 140 of the present disclosure is not specified as any one, and various types of resins known at the time of filing of this application may be employed as the polymer member 140 of the present disclosure. For example, the polymer member 140 may include an epoxy resin.

The polymer member 140 may be cured after being filled in at least a part of the inner space of the module case 130. In particular, the polymer member 140 may have a cured form after being injected into the module case 130 in a fluid state with fluidity such as liquid, gel or sol, in a state where the battery cells 110 are accommodated inside the module case 130.

For example, the polymer member 140 may be injected into the inner space of the module case 130 in the form of a liquid silicon resin to flow into the space between the battery cells 110 and/or the space between the battery cells 110 and the module case 130. In addition, the polymer member 140 may be configured to be cured through the elapse of a certain time or cooling. Moreover, the polymer member 140 may have a solid state at room temperature.

The filler 150 may include a plurality of particles. In addition, the plurality of particles of the filler 150 may be configured to be dispersed inside the polymer member 140. In particular, each of the plurality of particles provided in the filler 150 may be configured in the form of a pellet. The pellet may be manufactured in various ways, such as injection molding or powder compression. In this configuration, one pellet may be considered as one particle. Accordingly, the filler 150 may be regarded as including a plurality of pellets 151. The plurality of particles, namely pellets, 151 may be mixed with the polymer member 140 in a fluid state and then injected into the module case 130. In addition, the plurality of particles 151 may be configured to have fixed positions as the polymer member 140 in a fluid state is cured inside the module case 130.

In particular, the plurality of pellets 151 may be injected in a state where the plurality of battery cells 110 are accommodated in the inner space of the module case 130. At this time, after the plurality of pellets 151 serving as the filler 150 are injected into the inner space of the module case 130, the polymer member 140 in a fluid state may be injected into the inner space of the module case 130. Alternatively, the plurality of pellets 151 serving as the filler 150 may be mixed in advance with the polymer member 140 in a fluid state to form a mixture, and then the mixture of the pellets

151 and the polymer member 140 may be injected into the inner space of the module case 130.

The particles, for example pellets, 151 of the filler 150 may be configured to be interposed between the module case 130 and the battery cells 110 and/or between the plurality of battery cells 110 while the polymer member 140 in a fluid state is being injected into the inner space of the module case 130. To this end, the particles, for example pellets, 151 of the filler 150 may have a size or shape that can be inserted into the space between the module case 130 and the battery cells 110 and/or the space between the plurality of battery cells 110.

According to this embodiment of the present disclosure, by using the filler 150 such as the pellets 151, characteristics different from the polymer member 140 may be easily achieved inside the battery module 100. For example, the filler 150 may be advantageous in increasing the mechanical rigidity of the battery module 100. For example, when an external impact is applied to the battery module 100, since the plurality of pellets 151 having higher mechanical rigidity than the polymer member 140 are added inside the polymer member 140, the rigidity of the battery module 100 may be improved. Accordingly, in this case, the plurality of battery cells 110 may be more effectively protected from external impact. Moreover, according to this embodiment, the impact transmission between the battery cells 110 may be reduced by the plurality of pellets 151 serving as the filler 150.

Also, according to the embodiment, it may be advantageous to lower the manufacturing cost of the battery module 100. In particular, when a silicon resin is used as the polymer member 140 to ensure safety against heat or fire, the silicon resin may have a disadvantage of high price. However, according to this embodiment, since the amount of expensive materials such as the silicon resin may be reduced, the manufacturing cost of the battery module 100 may be lowered.

In addition, according to this embodiment, it may be advantageous to reduce the weight of the battery module 100. For example, when the filler 150 is made of a material having a weight smaller than that of the polymer member 140, the weight of the battery module 100 may be reduced.

The filler 150 may include a plastic material. Here, the plastic material used as the filler 150 may be employed from various materials known at the time of filing of this application. In particular, the filler 150 may include polytetrafluoroethylene (PTFE). The PTFE may be more advantageous since it has a low surface energy. In addition, polypropylene or polyethylene is a material with low surface energy and may be used as a material for the filler 150.

If the filler 150 is made of a plastic having a relatively low surface energy (surface tension) as above, when the filler 150 is mixed with the polymer member 140 in a fluid state, the influence of viscosity of the polymer member 140 may be reduced. Accordingly, the filler 150 may be more easily dispersed in the polymer member 140 in a fluid state. Therefore, in this case, due to even dispersion of the filler 150 inside the polymer member 140, the manufacturing efficiency may be increased, and it may be more advantageous to secure the effect of the filler 150, for example mechanical rigidity.

In addition, the filler 150 may include other various plastic materials, for example polyvinyl chloride, polystyrene, polyethylene terephthalate, and the like.

Moreover, the plastic material as described above may have advantages of light weight, low cost, and easy molding. Therefore, according to this embodiment, it may be advantageous in terms of weight reduction and cost reduction of the battery module 100. In addition, the plastic material may be advantageous to secure thermal insulation. Accordingly, the heat transfer between the battery cells 110 or between the battery cells 110 and the module case 130 may be more effectively blocked.

In addition, the filler 150 may include a ceramic material. The ceramic material may include at least one of sand, glass, cement, clay, refractory materials, abrasives, and fine ceramics. In addition, the sand may include at least one of quartz, limestone, iron ore, magnetite, basalt, obsidian, and olivine.

The ceramic material may include a material having a property that is strong against heat or flame. In this case, the heat or flame blocking effect of the filler 150 may be further improved.

In addition, the battery module 100 of the present disclosure may include a cooling member 160 for cooling the plurality of battery cells 110. As shown in FIG. 2, the cooling member 160 may be positioned below the lower frame 134. For example, the cooling member 160 may be configured such an external coolant is injected therein and a coolant heated by absorbing heat from the battery cell 110 is discharged to the outside. For example, the cooling member 160 may have an aluminum alloy material having excellent thermal conductivity.

Meanwhile, the particles, for example pellets, 151 of the filler 150 may be configured in various shapes. For example, as shown in FIG. 3, the pellets 151 may be formed in a spherical shape. According to this embodiment, since the pellets 151 are made in a spherical shape, the frictional force with the battery cell 110 may be minimized. In addition, since the pellets 151 have a spherical shape in this way, it may be advantageous to evenly fill the empty space between the plurality of battery cells 110 with high density. Moreover, according to this embodiment of the present disclosure, if an external shock is applied to the battery module 100, when the pellets 151 collide with the battery cells 110, damage to the battery cells 110 caused by the collision may be minimized.

Figure 4:
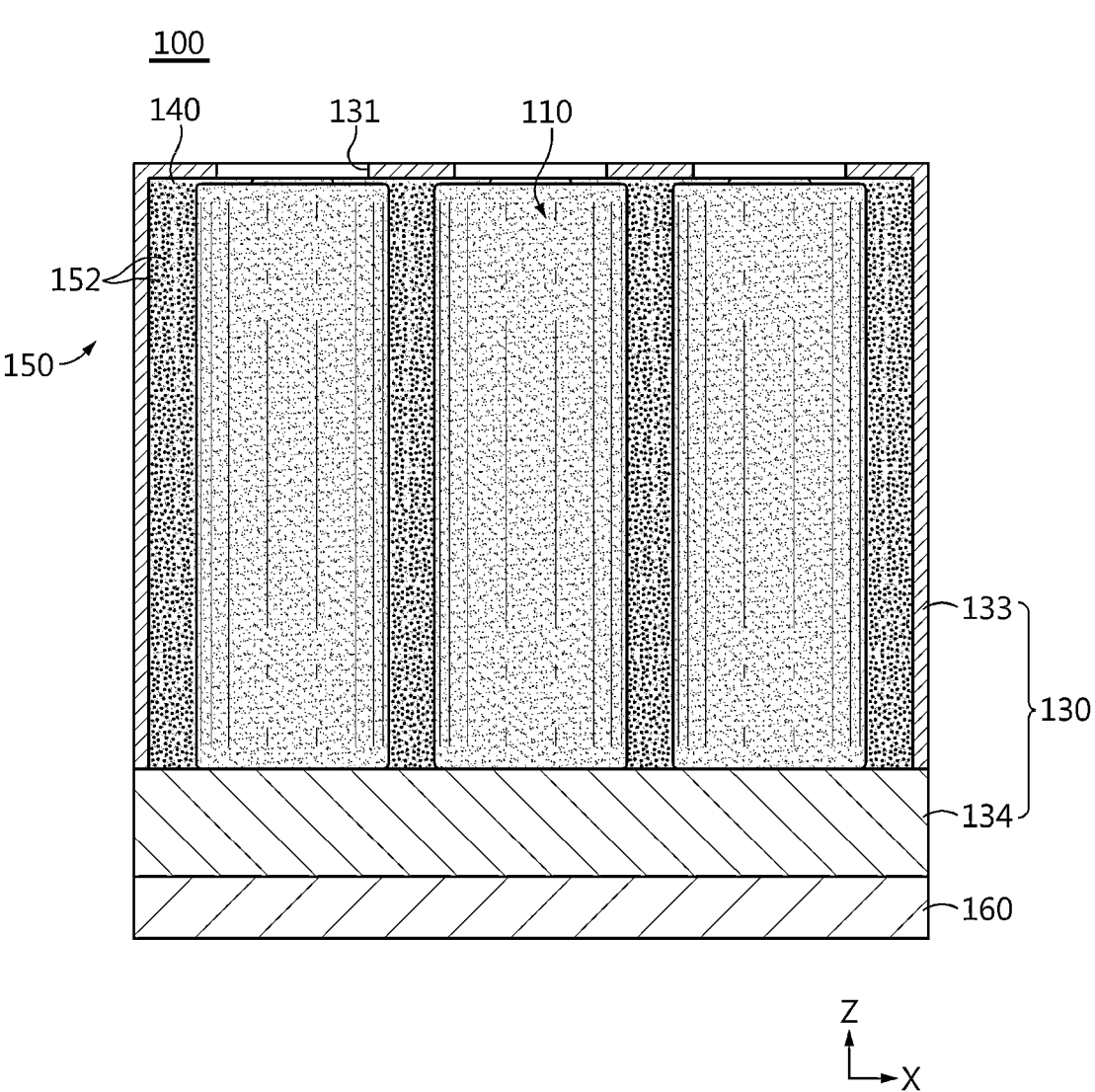
FIG. 4 is a diagram schematically showing an internal configuration of a battery module according to another embodiment of the present disclosure.

FIG. 4 is a diagram schematically showing an internal configuration of a battery module according to another embodiment of the present disclosure. For several other embodiments below, including this embodiment, features identical or similar to those of the former embodiment will not be described in detail, and features different therefrom will be described in detail.

Referring to FIG. 4, the particles of the filler 150 may be configured in a powder form. In this case, the filler 150 may be regarded as including a plurality of powder-type particles 152. If the pellet 151 of the former embodiment is processed or molded into a specific shape using a plastic material or a ceramic material, it may be regarded that the powder-type particle 152 of this embodiment is in a pulverized form using a plastic material or a ceramic material. Here, the powder-type particle 152 may have a smaller size than the pellet 151. For example, the size (average particle diameter) of the powder-type particle 152 may be 1 um to 1 mm.

The plurality of powder-type particles 152 may be injected into the module case 130 in a state of being mixed with the polymer member 140 in a fluid state. In addition, if the polymer member 140 is cured, the plurality of powder-type particles 152 may be dispersedly located inside the polymer member 140.

According to this embodiment of the present disclosure, the injection process of the polymer member 140 and/or the filler 150 may be performed more easily. That is, when the mixture of the polymer member 140 in a fluid form and the plurality of powder-type particles 152 is injected into the module case 130, the viscosity of the mixture to be injected may be easily adjusted according to the particle size of the powder-type particles 152. Accordingly, as a worker appropriately adjusts the viscosity of the mixture, the efficiency of the injection process may be further improved, for example to shorten the injection time into the module case 130.

Figure 5:
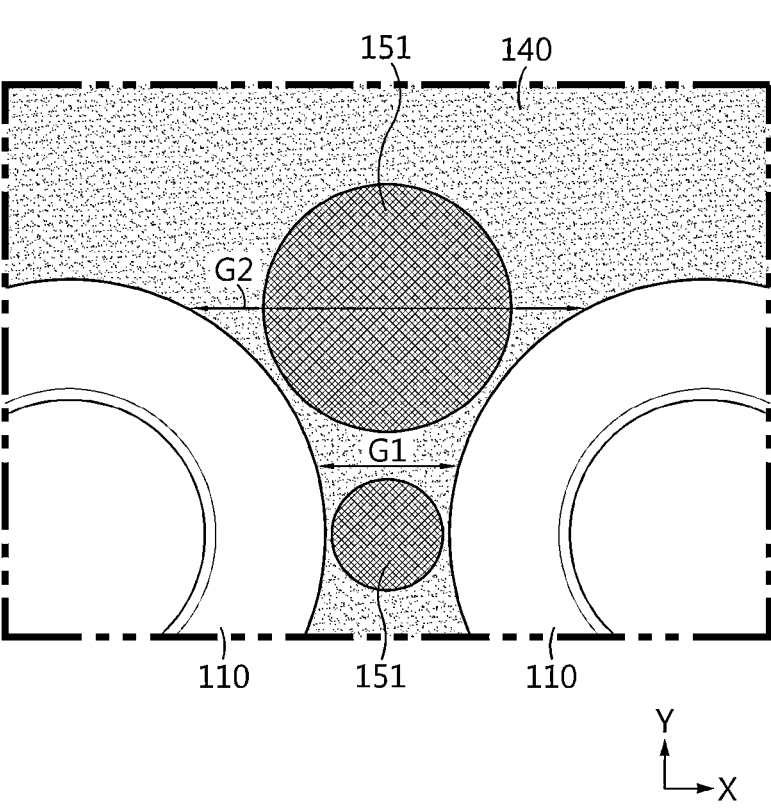
FIG. 5 is a diagram schematically showing an internal configuration of a battery module according to still another embodiment of the present disclosure.

FIG. 5 is a diagram schematically showing a part of an internal configuration of a battery module according to still another embodiment of the present disclosure.

Referring to FIG. 5, the filler 150 may include a plurality of particles having different sizes. For example, as shown in FIG. 5, when the plurality of pellets 151 are included in the polymer member 140 as filler particles, some of the plurality of pellets 151 may have a relatively large size (particle diameter), and other pellets may have a relatively small size (particle diameter). As a more specific example, some pellets 151 may have a particle size of approximately 1 mm, and other pellets 151 may have a size of approximately 0.5 mm.

In this embodiment, the plurality of particles, namely pellets, 151 having different sizes may be located in a space between different battery cells 110. For example, among the plurality of pellets 151, a pellet 151 having a relatively smaller size may be positioned in a narrow space between the battery cells 110, as indicated by G1 in FIG. 5. Meanwhile, a pellet 151 having a relatively larger size may be positioned in a relatively wider space between the different battery cells 110 or in a space between the battery cells 110 and the inner surface of the module case 130, as indicated by G2 in FIG. 5.

Therefore, according to this embodiment of the present disclosure, by providing a plurality of particles having different sizes as the filler 150, more filler 150 may be introduced into spaces of various sizes. In particular, spaces of various sizes may exist in the inner space of the module case 130. At this time, by injecting small-sized particles into narrow spaces, the polymer member 140 and the filler 150 may be present at an appropriate ratio to sufficiently accomplish their respective functions. In addition, by injecting large-sized particles into wide spaces, it is possible to reduce the input amount of the polymer member 140 and prevent the viscosity of the polymer member 140 from excessively increasing due to the filler 150.

In addition, in this case, the particles such as the pellets 151 may not be biased to any one place but be evenly dispersed in the polymer member 140. That is, according to this embodiment of the present disclosure, when a plurality of particles having two or more sizes are provided as the filler 150, it is advantageous that the plurality of particles are not biased in a specific region but are present to be evenly spread inside the polymer member 140. Accordingly, the effect of securing mechanical rigidity by the mixture of the polymer member 140 and the plurality of particles, for example the plurality of pellets, 151 may be further improved. Therefore, when an external shock is applied to the battery module 100, an external shock protection effect for the battery cell 110 may be further improved due to the improved mechanical rigidity.

Also, the filler 150 may include a plurality of particles having different weights (densities). That is, the filler 150 may include a plurality of particle groups having different weights. For example, the filler 150 may include a plurality of particles having three different weights. In this case, the plurality of particles may be divided into three particle groups according to their weights, which may be referred to as a first particle group, a second particle group, and a third particle group, respectively. Here, particles belonging to the first particle group may have the largest weight, and particles belonging to the second particle group may have a lower weight than the particles of the first particle group. In addition, the particles belonging to the third particle group may have a lower weight than the particles of the second particle group.

If a plurality of particles having different weights are included as the filler 150 as above, it may be advantageous that the filler 150 is more evenly dispersed inside the module case 130. For example, when three particle groups with different weights are included as in this embodiment, after the three particle groups are injected into the module case 130 in a state where these particle groups are mixed in the polymer member 140 in a fluid state, the three particle groups may dispersed in the upper and lower directions according to the weight. That is, in a state where the polymer member 140 in a fluid state has fluidity before being cured, the plurality of particles may be dispersed in the upper and lower directions inside the module case 130 according to weight. That is, the first particle group having the largest weight may be located near the lower end of the battery cell 110, and the third particle group having the smallest weight may be located near the upper end of the battery cell 110. In addition, the second particle group having an intermediate weight may be located near the central portion of the battery cell 110.

Meanwhile, this difference in weight may appear as a difference in specific gravity or density. For example, the first particle group may be made of a material having a higher specific gravity than the polymer member 140 in a fluid state. In addition, the third particle group may be made of a material having a lower specific gravity than the polymer member 140 in a fluid state. In addition, the second particle group may be made of a material having a specific gravity similar to that of the polymer member 140 in a fluid state.

In addition, the filler 150 may include a plurality of particles having different shapes (appearances). For example, the filler 150 may include two or more particles among quadrangular prism-shaped particles, triangular prism-shaped particles, spherical particles, and particles having at least one surface formed in a curved shape.

Since spaces of various shapes may exist in the inner space of module case 130, according to this embodiment, particles having a shape suitable for the shape of each space may be injected. Therefore, in this case, it may be advantageous that the particles are uniformly dispersed inside the module case 130.

Figure 6:
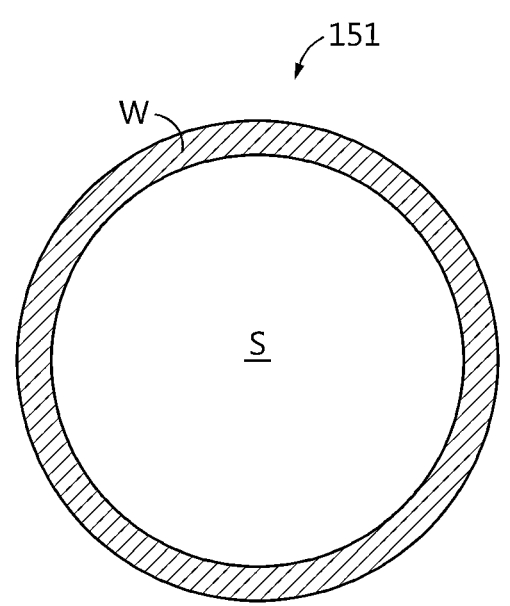
FIG. 6 is a cross-sectional view schematically showing particles of a filler included in the battery module according to still another embodiment of the present disclosure.

FIG. 6 is a cross-sectional view schematically showing particles of a filler included in the battery module according to still another embodiment of the present disclosure.

Referring to FIG. 6, the particles, for example pellets, 151 included as the filler 150 may have an empty space S formed therein. For example, the pellet 151 may have an outer wall W surrounding the empty space S. In addition, the empty space S of the pellet 151 may be filled with air. At this time, when the pellet 151 is pressed by swelling or movement of the battery cell 110, the battery cell 110 may be elastically supported. Moreover, the pellet 151 may be configured such that its volume is reduced or its external shape is changed when being compressed by the plurality of battery cells 110.

Therefore, according to this embodiment of the present disclosure, by means of the particles containing only gas such as air therein to have the empty space S, it is possible to buffer the pressure or shock applied to the cell 110 caused by an external collision of the battery module 100 or swelling of the battery cell 110.

In particular, when the outer wall W of the particle such as the pellet 151 is made of an elastic plastic material, the buffering effect of the pellet 151 may be more easily secured.

Figure 7:
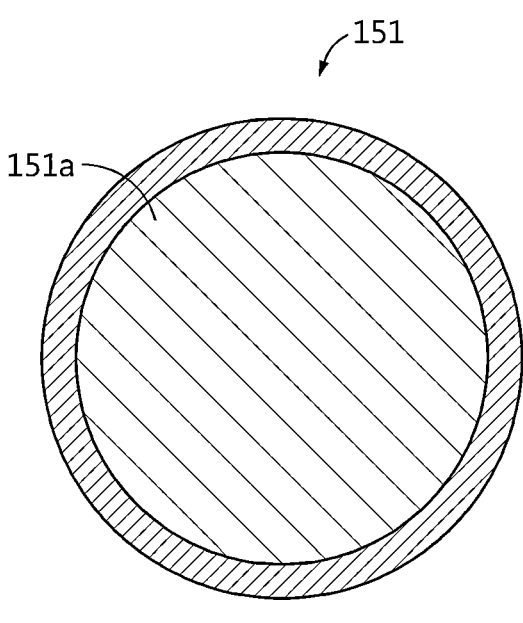
FIG. 7 is a cross-sectional view schematically showing particles of a filler included in the battery module according to still another embodiment of the present disclosure.

FIG. 7 is a cross-sectional view schematically showing particles of a filler included in the battery module according to still another embodiment of the present disclosure.

Referring to FIG. 7, the pellet 151 serving as the filler 150 may be configured to contain a fire-extinguishing material therein. In particular, the filler 150 may include a plurality of pellets 151 containing a fire-extinguishing material. Here, the pellet 151 may have an accommodating space formed therein, and the fire-extinguishing material 151a may be provided in the accommodating space. In particular, the pellet 151 may be configured in a capsule form in which the fire-extinguishing material 151a is filled. Here, the fire-extinguishing material 151a may be, for example, a concentrated solution of an inorganic salt such as potassium carbonate, a chemical foam, air bubbles, carbon dioxide, or water. In addition, as the fire-extinguishing material included in the particles of the filler 150, such as the pellets 151, various fire-extinguishing agents in a solid, liquid or gaseous state known at the time of filing of this application may be employed. In this embodiment, the pellet 151 may be configured to melt at a predetermined temperature. For example, the pellet 151 may be configured to be melted at 300° C. or higher and discharge the fire-extinguishing material 151a contained in the accommodation space therein to the outside.

Therefore, according to this configuration of the present disclosure, by the pellet 151 containing the fire-extinguishing material 151a, the safety of the battery module 100 may be further improved. For example, when a fire or explosion occurs in some of the plurality of battery cells 110 included in the battery module 100, the outer wall of the pellet 151 may be melted to discharge the fire-extinguishing material 151a contained therein to the outside, thereby suppressing the fire of the battery cell 110 in an early stage and effectively blocking the propagation of the fire. Accordingly, the present disclosure may significantly increase safety against fire.

Figure 8:
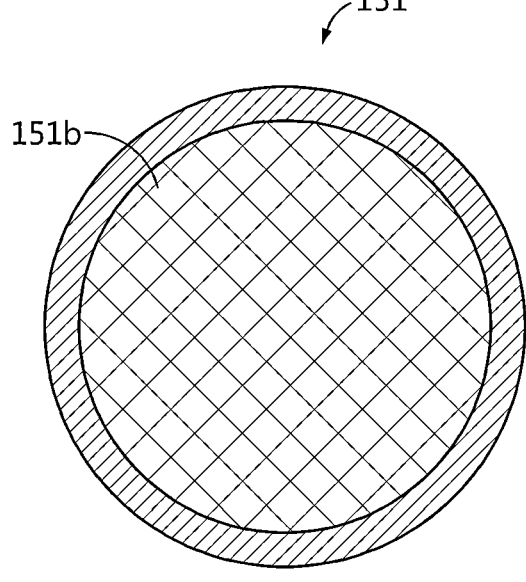
FIG. 8 is a cross-sectional view schematically showing particles of a filler included in the battery module according to still another embodiment of the present disclosure.

FIG. 8 is a cross-sectional view schematically showing particles of a filler included in the battery module according to still another embodiment of the present disclosure.

Referring to FIG. 8, the pellet 151 included as the filler 150 may be configured to contain a flame-retardant liquid. In particular, the filler 150 may include a plurality of pellets 151 containing a flame-retardant liquid. At this time, the pellet 151 has an accommodating space formed therein, and a flame-retardant liquid 151b may be provided in the accommodating space. Moreover, the pellet 151 may be configured in a capsule form containing the flame-retardant liquid 151b. Here, the flame-retardant liquid 151b may be, for example, a polymer resin mixed with a flame-retardant additive. The flame retardant additive may be alumina trihydrate, a bromine-based flame retardant, antimony trioxide, a phosphorus-based flame retardant, or the like. The polymer resin may be an acrylonitrile butadiene styrene (ABS) resin, a polypropylene (PP) resin, a polyamide (PA) resin, or a polycarbonate resin.

According to this embodiment of the present disclosure, by means of the pellet 151 containing the flame-retardant liquid 151b, the safety of the battery module 100 may be improved. For example, when a fire or explosion occurs in some of the plurality of battery cells 110, the outer wall of the pellet 151 may melt to discharge the flame-retardant liquid 151b accommodated therein to the outside. Accordingly, in this case, the flame-retardant liquid 151b may be supplied to the inside or outside of the battery cell 110 in which a fire has occurred, or the ruptured part of the battery can may be sealed. In this respect, the safety against fire may be greatly improved.

Figure 9:
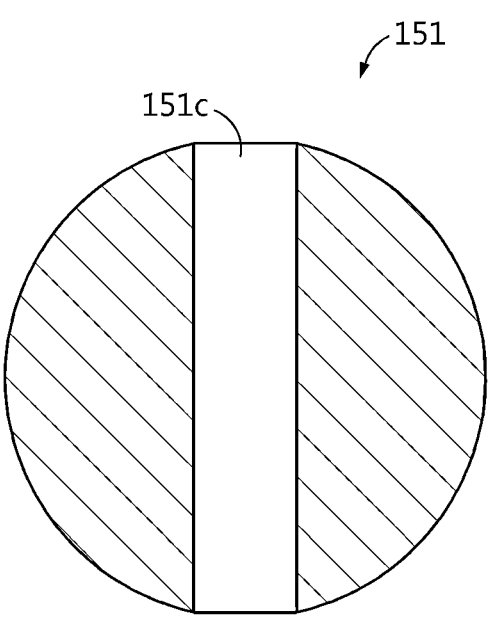
FIG. 9 is a cross-sectional view schematically showing particles of a filler included in the battery module according to still another embodiment of the present disclosure.

FIG. 9 is a cross-sectional view schematically showing particles of a filler included in the battery module according to still another embodiment of the present disclosure.

Referring to FIG. 9, the plurality of pellets 151 included as the filler 150 may be configured such that the polymer member 140 is partially inserted therein. For this purpose, the pellet 151 serving as a particle of the filler 150 may have at least one flow hole 151c formed therein. Here, the flow hole 151c, as shown in FIG. 9, may be configured to penetrate from one end of the pellet 151 to the other end. Alternatively, the flow hole 151c may be configured to be dug from one end of the pellet 151 to a predetermined point near the central portion. According to this embodiment, when the polymer member 140 has fluidity, the polymer member 140 may penetrate into the flow hole 151c. In addition, if the polymer member 140 is cured afterward, the polymer member 140 may be configured to be partially inserted into the flow hole 151c of the pellet 151.

According to this embodiment of the present disclosure, it may be more advantageous for even dispersion of the pellets 151 serving as the filler 150. In particular, when the flow hole 151c is formed to completely penetrate the inside of the pellet 151, the difference in specific gravity (weight) between the pellet 151 and the polymer member 140 may be alleviated. For example, even if the pellet 151 is made of a material with a lower specific gravity than the polymer member 140, the polymer member 140 may flow into the flow hole 151c, so that the pellet 151 moves downward inside the polymer member 140 in a fluid state without only floating upward. Therefore, in this case, the pellet 151 may be present not only in the upper part of the module case 130 but also in the lower part thereof.

In addition, according to this embodiment, the polymer member 140 may exist inside the pellet 151 serving as the filler 150. Therefore, even if a lot of pellets 151 are agglomerated, the characteristics of the polymer member 140 may be expressed over a certain level.

Figure 10:
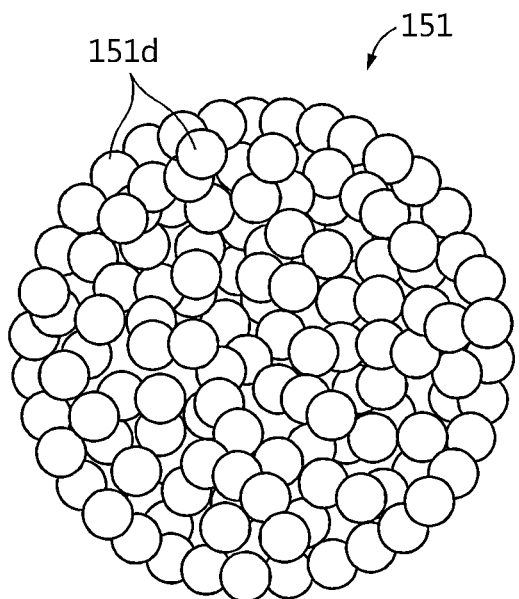
FIG. 10 is a cross-sectional view schematically showing particles of a filler included in the battery module according to still another embodiment of the present disclosure.

FIG. 10 is a cross-sectional view schematically showing particles of a filler included in the battery module according to still another embodiment of the present disclosure.

Referring to FIG. 10, each pellet 151 included as the filler 150 may be configured in a form in which a plurality of powder 151d are compressed to be mechanically coupled to each other. Alternatively, a binder or the like may be additionally provided between the plurality of powder 151d compressed together. Here, the powder 151d may be a powder of a plastic material or a powder of a ceramic material. In this embodiment, the pellet 151 may be configured to be dismantled by external impact. That is, since the pellet 151 is a state where a plurality of powder are mechanically combined, when a large impact is applied to the battery module, the pellet 151 may have a bonding force capable of being be dismantled (separated) into powder or various fragments.

According to this embodiment of the present disclosure, the impact may be alleviated while the pellet 151 is being dismantled into a form such as powder. In addition, it is possible to prevent the battery cell 110 from being damaged by powder or fragments generated by the dismantling of the pellet.

Figure 11:
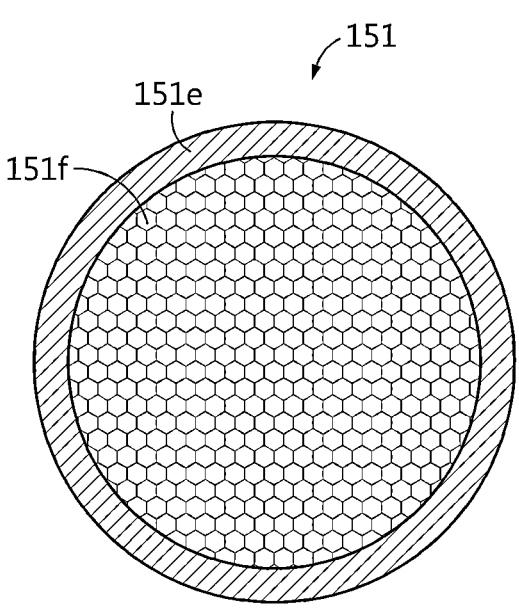
FIG. 11 is a cross-sectional view schematically showing particles of a filler included in the battery module according to still another embodiment of the present disclosure.

FIG. 11 is a cross-sectional view schematically showing particles of a filler included in the battery module according to still another embodiment of the present disclosure.

Referring to FIG. 11, a plurality of particles, for example, pellets 151, included as the filler 150 may include an outer layer 151e and an inner layer 151f. Here, the inner layer 151f may be configured in a porous form. Here, the inner layer 151f may be filled with air. In addition, the outer layer 151e may be configured in a closed form, so that the porous inner layer 151f may be accommodated therein. That is, the pellet 151 may have the outer layer 151e in a sealed form so that foreign materials do not penetrate inside.

For example, the inner layer 151f of the pellet 151 may be formed in a porous form by a foamed resin. For example, the foamed resin that forms the inner layer 151f may be a foamed polystyrene resin. In addition, the outer layer 151e of the pellet 151 may be configured by coating the outside of the porous inner layer with a polymer resin. For example, the polymer resin that forms the outer layer 151e may be polyvinyl chloride.

According to this embodiment of the present disclosure, by the porous inner layer 151f provided in the pellet 151, the impact buffering effect may be secured. Moreover, in this embodiment, since the outer layer 151e is configured in a closed form, it is possible to prevent the polymer member 140 in a fluid state from penetrating into the porous inner layer 151f. Therefore, in this case, it is possible to further reduce the amount of polymer member 140 used. Also, in this case, it may be more advantageous to lower the weight of the filler 150.

In addition, the filler 150 may include a plurality of particles configured in different shapes. In particular, the particles of various types described in the former several embodiments may be provided together as the filler 150 of the present disclosure.

For example, the filler 150 may include a group of pellets 151 having a shape as shown in FIG. 6 and a group of pellets having a shape as shown in FIG. 7 together. Alternatively, the filler 150 may include a group of pellets 151 having a shape as shown in FIG. 8 and a group of pellets having a shape as shown in FIG. 9 together. Alternatively, the filler 150 may be configured to include three or more types of pellets 151 among the pellets 151 configured as shown in FIGS. 6 to 11.

According to this embodiment of the present disclosure, in the inner space of the module case 130, the particles serving as the filler 150 may be more uniformly distributed. For example, when the pellets 151 of FIG. 6 containing air therein and the pellets 151 of FIG. 7 containing the fire-extinguishing material 151a therein are included as the filler 150 together, the pellets 151 of FIG. 6 may be lighter than the pellets 151 of FIG. 7. Accordingly, the pellets 151 of FIG. 6 may be located at the upper portion in the inner space of the module case 130, and the pellets 151 of FIG. 7 may be located at the lower portion in the inner space of the module case 130.

As another example, when the pellets 151 of FIG. 8 containing the flame-retardant liquid 151b therein and the pellets 151 of FIG. 9 having the flow hole 151c formed therein are included as the filler 150 together, the pellets 151 of FIG. 9 may be disposed lower than the pellets 151 of FIG. 8.

As still another example, when the pellets 151 of FIG. 10 and the pellets 151 of FIG. 11 are included together as the filler 150, the pellets 151 of FIG. 11 may be disposed higher than the pellets 151 of FIG. 10 due to the porous inner layer 151f.

Therefore, according to these embodiments, the filler 150 may be smoothly distributed in the vertical direction inside the inner space of the module case 130.

In addition, according to this embodiment of the present disclosure, the filler 150 may have various properties by various types of pellets 151. In particular, the various characteristics of various types of pellets 151 may be placed in a part where the corresponding characteristics are required.

For example, the pellets 151 of FIG. 7 or 8 may be disposed in a portion (the upper part in FIG. 3) where the positive electrode terminal 111 of the battery cell 110 is located. In this case, when high-temperature gas or fire is discharged to the positive electrode terminal side, the fire-extinguishing material 151a or the flame-retardant liquid 151b contained in the pellet 151 may be quickly discharged. Therefore, it may be advantageous in suppressing ignition or fire or preventing the spread of ignition or fire.

In addition, as pellets 151 other than the above pellets 151, the pellets 151 of FIG. 6, 10 or 11 may be located in the central part of the body of the battery cell 110 (the central part in the Z-axis direction in FIG. 3). In this case, when swelling of the battery cell 110 or an external shock occurs, the transmission of the shock between the battery cells 110 or from the module case 130 to the battery cell 110 may be alleviated.

Therefore, according to this embodiment of the present disclosure, since various pellets 151 configured in an appropriate shape according to the characteristics of each part of the battery module 100 are included as the filler 150, the effect according to the present disclosure, such as the safety of the battery module 100, may be further improved Meanwhile, a battery pack according to the present disclosure may include one or more battery modules 100 according to the present disclosure described above. In addition, the battery pack according to the present disclosure may include, in addition to the battery module 100, various components typically provided in the battery pack, for example, a battery management system (BMS) electrically connected to the battery module 100. In particular, the BMS may include various circuits or devices to control charging and discharging of the plurality of battery cells 110 included in the battery module 100.

Meanwhile, a vehicle according to the present disclosure may include one or more battery modules 100 according to the present disclosure described above. In particular, the vehicle may be a boarding device driven by electricity, such as an electric vehicle, an electric scooter, an electric wheelchair, or an electric bike. In addition, the vehicle according to the present disclosure may further include other various components included in the vehicle in addition to the battery module 100, such as a vehicle body, a motor, and an inverter.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: battery module
110: battery cell, 111: electrode terminal
120: bus bar, 121: metal wire
130: module case,
131: exposure hole, 133: upper frame, 134: lower frame,
    H: placing groove
140: polymer member
150: filler 151: pellet, 152: powder-type particle
S: empty space, 151a: fire-extinguishing material, 151b: flame-retardant liquid, 151c: flow hole
151d: powder, 151e: outer layer, 151f: inner layer
160: cooling member

What is claimed is:

1. A battery module, comprising:
a plurality of battery cells;
a module case having an inner space therein and accommodating the plurality of battery cells in the inner space;
a polymer member filled in at least a part of the inner space of the module case accommodating the plurality of battery cells; and
a filler at least partially inside the polymer member and interposed in at least one space of a space between at least one of the plurality of battery cells and the module case and a space between the plurality of battery cells,
wherein the filler includes a plurality of pellets, the filler includes a different material than the polymer member,
wherein each of the pellets includes a flow hole penetrating from one end of each respective pellet to another end of the respective pellet, and
wherein the polymer member is partially disposed in the flow hole of each respective pellet.

2. The battery module according to claim 1, wherein the polymer member includes a silicon resin.

3. The battery module according to claim 1, wherein the polymer member is cured after being filled in at least a part of the inner space of the module case.

4. The battery module according to claim 1, wherein the pellets of the filler are dispersed inside the polymer member.

5. The battery module according to claim 1, wherein the pellets of the filler includes a plastic material or a ceramic material.

6. The battery module according to claim 1, wherein the filler includes a plurality of pellets with different sizes.

7. The battery module according to claim 1, wherein the filler contains a fire-extinguishing material therein.

8. The battery module according to claim 1, wherein the filler contains a flame-retardant liquid therein.

9. The battery module according to claim 1, wherein the filler includes a plurality of pellets that respectively have an outer layer and a porous inner layer.

10. A battery pack, comprising at least one battery module according to claim 1.

11. A vehicle, comprising at least one battery module according to claim 1.

12. The battery module according to claim 1, wherein the pellets have a diameter between 0.5 mm and 1 mm.

* * * * *